United States Patent [19]

Yamazaki

[11] Patent Number: 4,889,759
[45] Date of Patent: Dec. 26, 1989

[54] MASKING PAPER

[75] Inventor: Takashi Yamazaki, Tokyo, Japan

[73] Assignee: Johoku Industries Ltd., Tokyo, Japan

[21] Appl. No.: 203,539

[22] Filed: Jun. 1, 1988

Related U.S. Application Data

[63] Continuation of Ser. No. 113,416, Oct. 27, 1987, abandoned, which is a continuation of Ser. No. 15,511, Feb. 13, 1987, abandoned, which is a continuation of Ser. No. 800,349, Nov. 21, 1985, abandoned.

[51] Int. Cl.$^4$ .......................... B32B 31/28; C09J 7/02
[52] U.S. Cl. ........................................ 428/181; 428/40;
428/179; 428/192; 428/343; 428/352; 428/354;
428/446; 428/451; 428/906; 428/447; 428/452
[58] Field of Search ............... 428/181, 906, 352, 343,
428/192, 40, 179, 176, 353, 354, 446, 447, 451,
452

[56] References Cited

U.S. PATENT DOCUMENTS

| | | | |
|---|---|---|---|
| 2,808,358 | 10/1957 | Masse | 428/343 |
| 3,752,304 | 8/1973 | Alef | 428/906 |
| 4,024,837 | 5/1977 | Snyder | 428/40 |
| 4,039,707 | 8/1977 | O'Malley | 428/352 |
| 4,056,661 | 11/1977 | Sato et al. | 428/352 |
| 4,263,347 | 4/1981 | Banta | 428/906 |
| 4,427,726 | 1/1984 | Wolfrum | 428/352 |

Primary Examiner—Ellis P. Robinson
Assistant Examiner—Donald J. Loney
Attorney, Agent, or Firm—Oblon, Spivak, McClelland, Maier & Neustadt

[57] ABSTRACT

An apparatus for allying and dispensing a masking paper wound in a roll form includes a housing accommodating the masking paper, a group of rolls for taking the masking paper out of the housing and a cutter blade for cutting the masking paper. The masking paper is a relatively thin synthetic resin film folded in a plurality of parallel pleats and a relatively thick tape disposed along a longitudinal margin of the film and having a pressure sensitive adhesive layer formed on the opposite sides thereof.

1 Claim, 3 Drawing Sheets

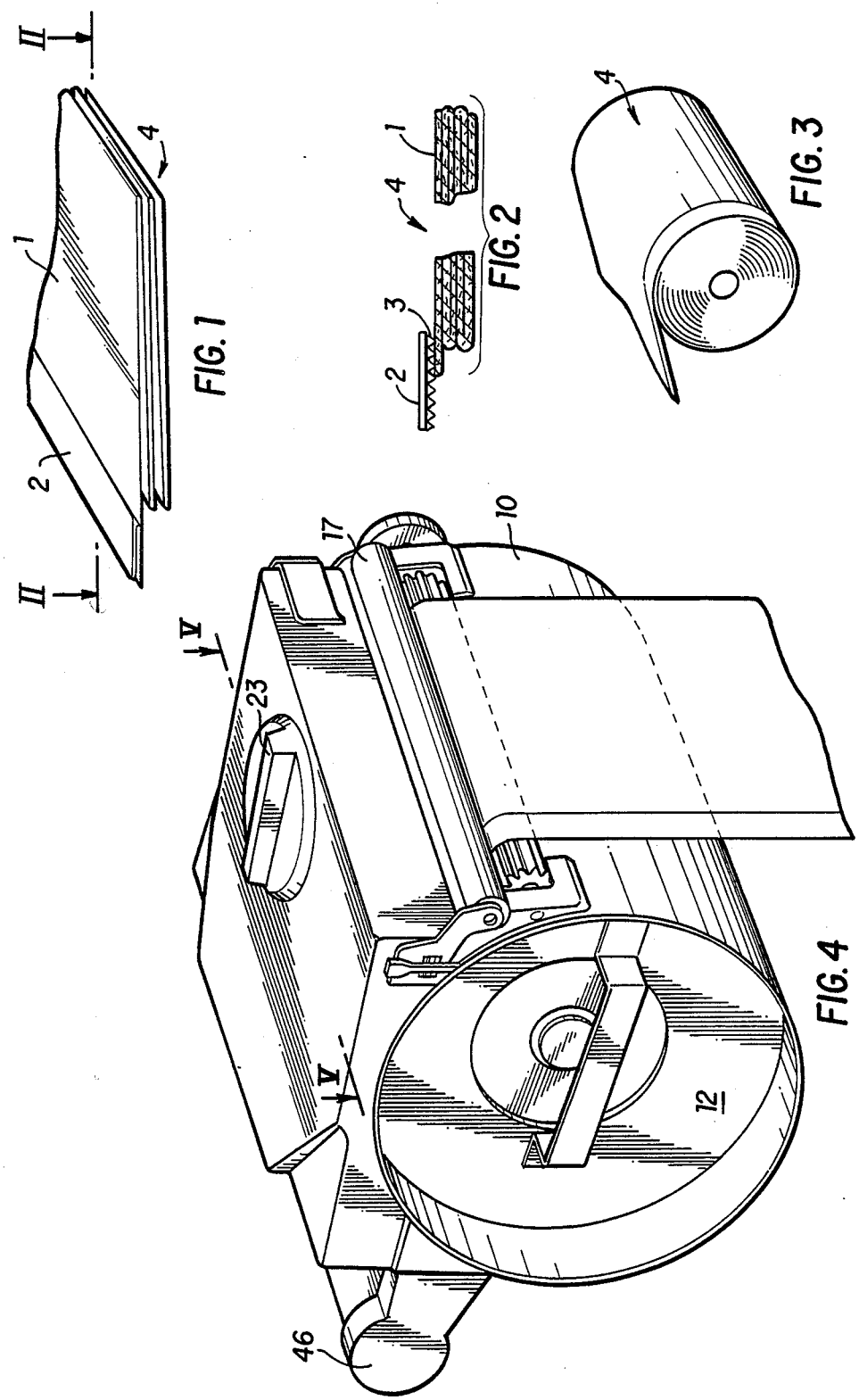

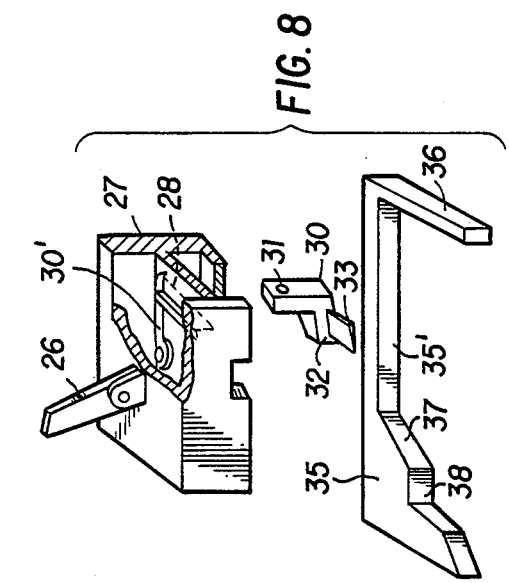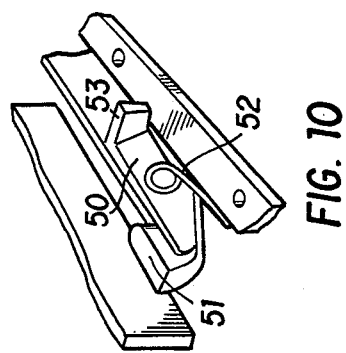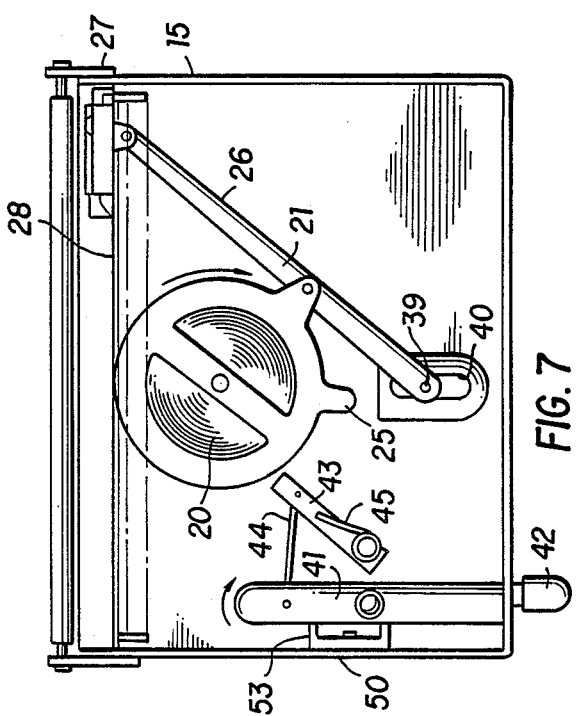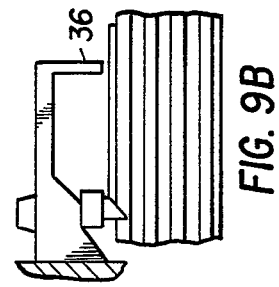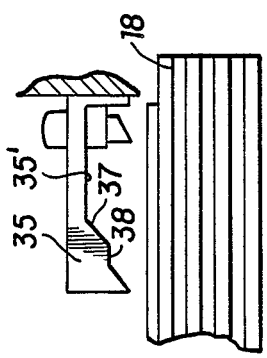

MASKING PAPER

This application is a continuation of application Ser. No. 07/113,416 filed on Oct. 27, 1987, now abandoned, which is a continuation of application Ser. No. 07/015,511 filed on Feb. 13, 1987, now abandoned, which is a continuation of application Ser. No. 06/800,349 filed Nov. 21, 1985, now abandoned.

BRIEF DESCRIPTION OF THE DRAWINGS

FIG. 1 is a view of the masking paper according to the invention folded into several parallel pleats which run in the longitudinal direction.

FIG. 2 is a cross-section of the making paper in FIG. 1.

FIG. 3 is a view of the masking paper rolled into a coil for convenience of carrying and handling the masking paper for application.

FIGS. 4–10 all show one embodiment of an applicator device for the masking paper described in FIGS. 1–3.

Referring to FIG. 1, there is shown a masking paper 4 having a masking strip 1 which may be a thin synthetic resin film. It is substantially elongate, and has a determined width great enough to mask a surface or portion of an object which is not to be painted. If the masking paper 4 is used in painting the vertical wall surface of a building having a window or windows therein, the masking strip should have a substantially equal width to the height of the window or windows. As shown, the masking strip 1 is folded into several parallel pleats which run in the longitudinal direction. The strip has a relatively thick tape 2 bonded along the longitudinal margin. Specifically, as shown in FIG. 2, the tape has a pressure-sensitive adhesive layer 3 overall on the one side and is laid width wisely halfway on the longitudinal margin of the masking paper strip, leaving the other half section of the adhesive layer unconcealed.

Figure 5:
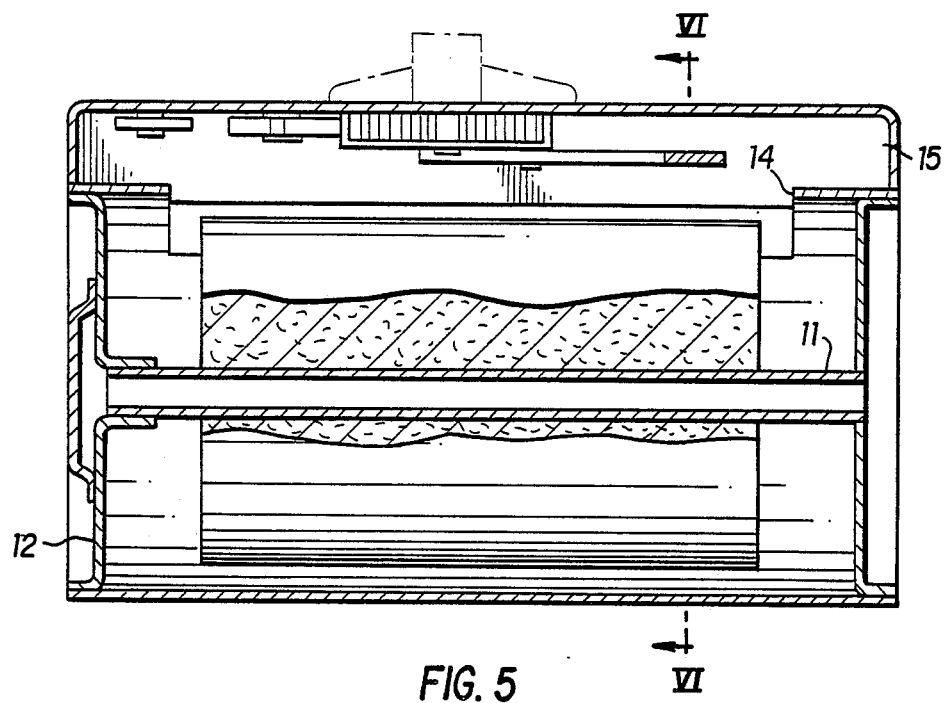

For conveniences of carrying and handling the masking paper for application, it is to be wound as folded in a coil, as shown in FIG. 3, where the unconcealed adhesive layer in one turn lies on the opposite side surface of the tape in the next turn. The opposite side surface of the tape may be treated with silicon to keep the overlying portions untacky.

A painter may conveniently carry the masking paper roll 4 to, say, a building where he would do his operation. Unwinding the masking paper roll, he may manually extend a length of the masking paper along the width length of a window to be masked and press the unconcealed pressure-sensitive adhesive layer against the upper member of the window frame. When he has produced a desired length of the masking paper from the roll to cover the width of the window, he may cut it from the roller. The pleated portion fixed by the tape onto the upper window frame member in place can be unfolded and expanded by manually pulling the lower edge of the strip to conceal the overall surface of the window. With the window surface being thus concealed, the painter can perform the painting operation without inadvertently smearing the window portion with his paint. After finishing the painting operation, he can easily detach the masking paper by delaminating the unconcealed adhesive portion from the window frame member.

FIGS. 4–10 all show one embodiment of an applicator device for the masking paper roll 4 described in the foregoing. The applicator device comprises a hollow cylindrical casing 10 having one end closed by an end wall and the other end openably closed by a removal closure member 12. A center core shaft 11 for rotatably supporting a masking paper roll as accommodated in the casing integrally extends from the inner side of the end wall axially of the cylindrical casing to have an end adapted to be received in a sleeve-like projection 13 formed on the inner side of the closure member 12.

Figure 6:
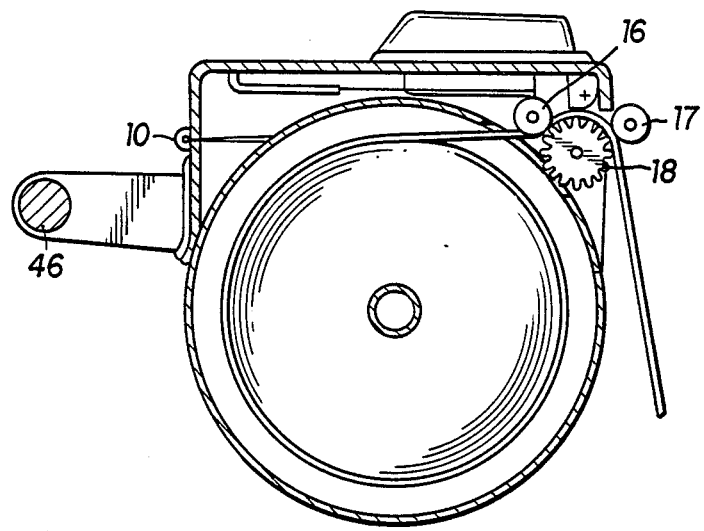

The casing is provided with an opening 14 in the upperside and with a closure plate 15 pivotally mounted thereon adapted to the opening 14 forming a gap or outlet through which an uncoiled end of the masking paper roll may be taken out, as clearly seen in FIG. 6. The closure plate has a pair of rolls 16 and 17 carried therein in parallel with each other adjacent the outlet. The rolls are spaced from each other by a certain distance. Immediately below the spacing of the rolls provided is a taken-out roll 18 having a star-like sectional shape with a plurality of axial grooves through which a blade end can axially travel in the manner which will be described. The take-out roll 18 has a knob protruding outside of the casing so that take-out roll can be manually turned.

FIG. 7 shows the inner side of the closure plate 15 centrally having a spring box 21 and a helical coil spring 20 of the known type. The coil spring has its center end connected to a knob 23 in the upperside of the closure plate, whereby manual rotation of the knob winds up the helical coil spring. With the knob being released for free rotation, the coil spring will be unwound and the spring box will thereby revolve in the direction of arrow in FIG. 7. The spring box is provided in the side with a link protrusion 24 and a stopper protrusion 25. The closure plate 15 has a guide track 28 extending along the lateral side adjacent the take-out roll 18. A link lever 26 has one end connected pivotally to a blade carrier 27 which is guided by the guide track 28 for sliding movement therealong and the other end provided with a tongue 39 loosely fitted in an elongate groove 40 vertically of the closure plate. The link lever is connected pivotally to the link protrusion 24 of the spring box at the intermediate portion between its opposite ends. Thus, rotation of the spring box causes the link lever to make a swing movement with its one end moving linearly in parallel with the take-out rolls 18 and the other end in a normal direction to the same, thereby driving the blade carrier 27 along the track.

As shown in FIG. 8, the blade carrier 27 has an intermediate wall 28 with a vertical groove 29 formed in one surface. A reversed L-shaped adjustment piece 30 is carried in the blade carrier. The adjustment piece has a vertical section 31 snugly fitted in the vertical groove 29 in the carrier for movement therealong. A spring 30' is seated on the surface of the intermediate wall 28 and has the upper end engaging on the upper end of the adjustment piece for urging the latter in the upward direction of FIG. 8. The adjustment piece has a horizontal portion 32 and a cutting blade 33 fixed on the underside of the horizontal portion, with its cutting blade projecting in the downward direction. The cutting end of the blade is thus radially positioned in one of the axial grooves in the periphery of the take-out roll 18.

The carrier 27 has a cam member 35 of the cam surfaces, as shown in FIGS. 8 and 9, consisting of a normally bent portion 36 at the right end as viewed in the figures, and at the left side, a face 37 slantingly extending from a flat elongate face 35', normal to the bent portion 36, and a face 38 extending from the latter but in parallel with the flat face 35'. The cam member 35 is assembled in the adjustment piece 30, with the face 35' slidingly in contact with the horizontal portion 32 of the adjustment piece.

The closure plate 15 has an operation lever 41 centrally pivoted on the inner surface thereof. The operation lever has an end protruding from the closure plate and a manual knob member 42 mounted on the protruding end. The operation lever has the upper end connected by a link rod 44 to an engagement lever 43 which is pivoted to the inner surface of the closure plate and has a spring 45 acting to urge the engagement lever 43 in the direction that the upper end thereof is brought in contact with the spring box 21. The spring 45 thus exerts a force urging the operation lever 41 connected by link lever to turn about the pivot in the direction of the arrow of the figure.

The applicator device has a handle 46 mounted in the casing for facilitation of transport and handling of the device.

In use, a masking paper roll 4 is placed in the casing 10, and the unwound end of the roll is engaged on the periphery of take-out roll 18 with the closure plate 15 remaining open. When the latter is moved to the closed position, the unwound end of the roll is pressed on the take-out roll 18 by means of rolls 17 and 18 carried on the closure plate, so that upon manual rotation on the knob 19 of the take-out roll 18, the masking paper roll can be freely unwound to a desired length of the end taken out from the casing.

Obviously, the dispensor according to the invention is light enough to carry away by the aid of the mounted handle 46 to any location where use of a masking paper is desired. A length of the taken-out masking upper end can be stuck on, for instance, the upper member of a window frame in place by action of the pressure-sensitive adhesive layer 3 on the side tape 4, before the end stuck thereon is cut apart from the roll. The painter can then move the dispenser device along the upper member of the window frame, causing an additional length of the masking paper end to be taken out from the roll, which facilitates taking out eventually to a desired length to cover the whole length of the window frame. After a desired length of paper end is produced, the paper end is stuck in place over the whole length.

When the knob 23 on the surface of the closure plate is manually turned, the spring box 21 turns against the action of spring 20, so that the link lever 26 connected to the spring box by the link protrusion 24 thereby makes a pivotal movement with the pivot 39 reciprocatingly guided in the slot 40 to displace the blade carrier 27 in the guide track to the left side direction of FIG. 7.

Before displacement of the blade carrier 27, the components related to the carrier take the positions shown in FIG. 9(A) where the adjustment piece 30 biased upwards by the spring 30' has the vertical section in contact with one portion of the flat face 35' of the cam member 35, so that the cutter blade 33 on the adjustment piece is spaced from the periphery of the take-out roll 18 by a sufficient distance to prevent the masking paper 4 from being otherwisely inadvertently damaged thereby. As the carrier 27 is displaced as above mentioned and approaches the opposite side of the closure plate 15, the left end of the cam member 35 first comes into contact with the inner surface of the closure plate 15. The relation of adjustment piece 30 to the carrier 27 is also displaced so that the upperside of the piece 30 becomes abutting against the slant face 37 which then moves the piece downwards as viewed in FIG. 9(B) against action of spring 30'. The adjustment piece then rides on the parallel flat face 38 wherein the cutting tip of the blade is positioned in one of the axial grooves of the take out roll 18 as shown in FIG. 9(B).

Simultaneously with completion of the sliding stroke of the blade carrier 27, the stopper protrusion 25 of the spring box 21 gets engaged with the lever 43, thereby preventing reverse turning thereof by action of the restoring face of the spring 20. With a designed length of paper end being stuck over the whole length of, e.g. a pane frame, a manual push of the operation knob 42 in the right direction of FIG. 7 permits an instantaneous cutting operation across the tape 3. Specifically, the right-hand thrust of the knob causes the link rod 44 to turn the upper end of the engagement piece 43 against spring 45 out of engagement with the protrusion 25. Consequently, the spring box 21 is free to turn back and thereby the blade carrier 27 travelling to the right direction of FIGS. 7 and 9 while the cutting blade with its tip positioned in the groove of the take out roll 18 can cut off the sheet 4 overlying on the roll 18. Toward the right end position of the blade carrier, the bent end portion 36 of the cam member 35 first gets in contact with the inner wall surface of the closure plate 15. The subsequent relative movement between the cam member and the cutter blade permits the latter to be raised away from the periphery of the take-out roll or paper.

The paper 4 thus left sticking on the upper member of the pane frame has the edge section of the film unfolded down manually by the user to mask an area to be not painted.

FIG. 10 shows a safety device incorporated in the applicator apparatus according to the invention for preventing the blade carrier 27 or the cutter blade 33 from the sliding movement while the closure plate 15 is in the open position. The closure plate 15 must be open when the initial taking-out operation of the masking paper from the roll is performed by the user. The safety device will thus protect the user from being injured by the cutter blade by blocking the free travel of the latter.

The safety device comprises a lock lever 50 pivotally mounted on the side plate of the closure plate and having opposed ends 51 and 53, the one end 51 being adapted to contact with the applicator housing section when the closure plate is closed, and the other end 53 being adapted to engage the operation lever 41 in the locked position. A spring 52 is disposed on the lock lever 60 to urge the lock lever in the direction where the end 53 engages the operation lever 41 in the locked position. When the closure plate is closed with the safety device carried therein, the applicator housing contacts with the end 51 of the lock lever and pivots the latter against action of the spring 52 to bring the other end 53 of the lock lever out of the engagement with the operation lever, thus leaving the latter pivotable by the manual thrust on the knob 42. When the closure plate is open without the applicator housing engaging the lock lever at the end 51, the spring 52 acts to urge the lock lever into the position where the latter engages and locks the operation lever.

What is claimed is:

1. A masking paper adapted to be dispensed from an apparatus for enclosing a roll of said masking paper, advancing a length of said masking paper to be dispensed and cutting said dispensed length, comprising:

a thin synthetic resin film folded at least once to form at least two equal length parallel pleats; and a thick tape having a pressure sensitive adhesive layer formed on one side thereof and a silicon containing release coating on an other side thereof, wherein a portion of said one side of said tape is adhered to an edge of said film which is parallel to the at least one fold, wherein said film is rolled into a roll such that another portion of said one side of said tape is rolled onto said other side of the tape of an adjacent turn of said roll, and wherein said silicon containing release coating coats all of said other side, whereby said masking paper may be easily dispensed from a dispensing apparatus enclosing a roll of said masking paper and advancing a length of said masking paper to be dispensed.

* * * * *